UNITED STATES PATENT OFFICE.

EDWARD J. WALL, OF SYRACUSE, NEW YORK, ASSIGNOR TO KALMUS COMSTOCK & WESCOTT, INCORPORATED, OF BOSTON, MASSACHUSETTS, A CORPORATION OF MASSACHUSETTS.

DYE RECOVERY.

1,337,673.   Specification of Letters Patent.   Patented Apr. 20, 1920.

No Drawing.   Application filed May 18, 1917. Serial No. 169,464.

*To all whom it may concern:*

Be it known that I, EDWARD J. WALL, a subject of the King of Great Britain, and resident of Syracuse, in the county of Onondaga and State of New York, have invented new and useful Improvements in Dye Recovery, of which the following is a specification.

This invention relates to the recovery of dye from dye solutions and more particularly to the recovery of dye from dye solutions used for color-sensitizing collodion or gelatin emulsions or other light responsive substances.

There have been two methods in common practice for sensitizing collodion and gelatin emulsions, viz., one in which the dye is added to the emulsion just before coating the same on the film or other support, and one in which the finished dry plate or film is bathed in an aqueous solution of the dye. The first method has been generally adopted in the commercial manufacture of color-sensitive plates and film, not on the basis of efficiency and effectiveness but because of its convenience. The second method affords results which are far superior with respect to color rendering, but it has not been extensively adopted commercially chiefly for the reason that it has been extremely wasteful and therefore costly.

Heretofore, in employing the second or bathing method it has been possible to use the dye solution for only a comparatively short time. As described in the application of Daniel F. Comstock and Edward J. Hall, Sr. No. 179,050, filed May 6, 1917, the dye solutions, which are of colloidal character, begin to precipitate the dye after a brief association with the photographic emulsions, and their sensitizing power rapidly diminishes. Moreover, even in the absence of precipitation the sensitizing power of the solutions gradually decreases owing to absorption of the dye by the emulsions. The addition of fresh dye to strengthen a dissipated solution is not feasible for the reason that the strength of the solution can not be kept sufficiently constant in this way, especially when the dye is composed of a plurality of components which are absorbed by the silver grain and gelatin in varying proportions. In order successfully to prolong the useful life of a dye solution by adding fresh dye, it is necessary continually to test the solutions spectrographically; and this is impractical. Consequently it has been the practice heretofore wholly to discard the solutions after a short period of use.

In the case of the triphenylmethane, phthalein or similar dyes, the rejection of used and partially exhausted baths is of no serious moment as these dyes are comparatively cheap. However, since the introduction of the isocyanin and similar dyes, which have proved to be vastly superior, this wastage of dye has rendered the bathing method practically prohibitive. And irrespective of the cost of the dye the bathing method has been exceedingly uneconomical inasmuch as only a relatively small portion of the dye content of the bathing solution has been used. The above mentioned prior application discloses a way in which the useful life of a dye solution can be greatly prolonged but in any event the solution becomes useless before the dye content is completely exhausted.

The objects of the present invention are to recover the dye from partially spent solutions so that it may be employed in the preparation of other dye solutions and to recover the dye in substantially its original form so that it may be employed in the same way as fresh dye.

There is a certain class of absorbent materials for which basic dyes, such as isocyanin and like dyes, have a great affinity, which are insoluble in an aqueous solution of these dyes, and which are insoluble in certain dye solvents such as alcohol, acetone, etc. This class of materials I designate generally as insoluble dye-absorbent materials. Examples of this class of ingredients are hydrocellulose, oxycellulose, and other cellulosic materials, absorbent cotton, wool, linen, etc. While all of these ingredients, as well as other animal and vegetable substances may be employed with fair results, I have found that distinctly superior results can be obtained with the cellulosic materials by virtue of the marked affinity of basic dyes for such materials.

In one of its aspects the invention comprises recovering dye from a spent dye solution by bringing the dye solution into such intimate association with the cellulosic or other insoluble dye-absorbent material as to unite the dye with the cellulosic material, and extracting the dye from the absorbent material as for example by dissolving the dye out from the absorbent material with alcohol or other solvent in which the absorbent material is insoluble. More particularly the invention comprises introducing into the spent dye solution cellulosic or like matter in finely divided form, for example in fibrous form or in the form of small particles as obtained by the precipitation of an ammonio-cupric or other solution of cellulose, agitating the absorbent matter in the dye solution, recovering the absorbent matter with its absorbed dye from the dye solution, drying the matter, and subsequently subjecting the matter to the action of a dye solvent so as to extract the dye therefrom. And I employ the term absorb in its generic sense to include the adsorption of dye upon the surface of the fibers or particles of absorbent matter as well as the absorption of dye throughout the interior of the fibers or particles of matter.

I have also found that the absorbent matter can be caused to take up the dye more rapidly and more thoroughly by impregnating it with certain dye mordants, suitable ingredients for this purpose comprising aluminum hydroxid, antimony hydroxid, iron hydroxid, tin hydroxid, and other metallic hydroxids.

In another aspect, therefore, the invention involves a composition for recovering dye from a dye solution comprising cellulosic or other insoluble dye-absorbent matter, preferably in fibrous or other finely divided form, impregnated with a dye mordant, preferably a metallic hydroxid, which is adapted to accentuate the affinity of the dye for the absorbent matter.

Another feature of the present invention in its more specific aspect involves the use of a binding agent for causing the hydroxid or other dye mordant to unite more firmly with the cellulosic matter, a suitable binding agent being tannin.

I claim:

1. The method of recovering the dye from a dye solution comprising bringing the dye solution into such intimate relationship with dye-absorbent matter as to unite the dye with the absorbent matter, and extracting the dye from the absorbent matter.

2. The method of recovering the dye from a dye solution comprising bringing the dye solution into such intimate relationship with cellulosic matter as to unite the dye with the cellulosic matter, and extracting the dye from the absorbent matter.

3. The method of recovering the dye from a dye solution comprising introducing cellulosic matter in finely divided form into the dye solution so as to absorb the dye, and subsequently subjecting the cellulosic matter to the action of a dye solvent so as to extract the dye from the cellulosic matter.

4. The method of recovering the dye from a dye solution comprising introducing cellulosic matter in fibrous form into the dye solution so as to absorb the dye, and subsequently subjecting the cellulosic matter to the action of a dye solvent so as to extract the dye from the cellulosic matter.

5. The method of recovering the dye from a dye solution comprising bringing the dye solution into such intimate relationship with cellulosic matter impregnated with a dye mordant as to unite the dye with the cellulosic matter, and extracting the dye from the impregnated matter.

6. The method of recovering the dye from a dye solution which comprises causing the dye to adhere to dye-absorbent matter, and subsequently extracting the dye from the absorbent matter.

7. The method of recovering dye from a dye solution by absorbing the dye from the solution with absorbent matter and dissolving the dye out of the absorbent matter with alcohol.

8. The method of recovering dye from a dye solution by absorbing the dye from the solution with finely divided cellulosic matter and dissolving the dye out of the absorbent matter with alcohol.

Signed by me at Boston, Massachusetts, this fifteenth day of May, 1917.

EDWARD J. WALL.